United States Patent [19]

Questad

[11] 4,214,130
[45] Jul. 22, 1980

[54] SIGNAL COUPLER

[75] Inventor: Philip J. Questad, Kirkland, Wash.

[73] Assignee: Teltone Corporation, Kirkland, Wash.

[21] Appl. No.: 885,375

[22] Filed: Mar. 10, 1978

[51] Int. Cl.$^2$ ............................................. H04M 1/00
[52] U.S. Cl. .................................................. 179/81 R
[58] Field of Search ............... 179/81 R, 84 R, 1 C, 179/2 C, 170 G, 170 NC, 170 T; 333/80 R, 80 T; 307/313

[56] References Cited

U.S. PATENT DOCUMENTS

| 3,886,322 | 5/1975 | Colardelle et al. | 179/170 NC |
| 3,955,053 | 5/1976 | Picard | 179/170 NC |

OTHER PUBLICATIONS

Engling et al., "A Single Substrate Thin Film Active Telephone Network Using TMM Capacitors and Tantalum Nitride Resistors," Proceedings of the 1970 Electronic Components Conference, May 1970, pp. 320–327.

Primary Examiner—Robert S. Tupper
Assistant Examiner—Joseph A. Popek
Attorney, Agent, or Firm—Christensen, O'Connor, Johnson & Kindness

[57] ABSTRACT

A signal coupler for coupling tone, voice and other signals to a pair of communication wires, such as the tip and ring leads of a telephone line is disclosed. The signal coupler comprises a gyrator, a capacitor and a controllable voltage source. The capacitor and controllable voltage source are series connected to the input of the gyrator. The controllable voltage source is modulated by the signal to be coupled and, in turn, modulates the input of the gyrator. The output of the gyrator is connected across the pair of communication wires, whereby the gyrator modulates the loop holding current in accordance with the nature of the signal to be coupled. As a result, the signal is coupled to the communication wires.

16 Claims, 4 Drawing Figures

SIGNAL COUPLER

BACKGROUND OF THE INVENTION

This invention is directed to electronic couplers and, more particularly, to couplers for coupling signals to communication wire pairs, such as the tip and ring leads of telephone communication systems.

In the past, signals such as tone, voice, data and the like have been coupled to the wire pairs of communication systems, such as the tip and ring leads of telephone communication systems, via a transformer. For example, when a telephone goes off in order to answer an incoming call, an indication of the off-hook status of the telephone is created by coupling an answer tone to the tip and ring leads. In the past, answer tone coupling has usually been accomplished via a coupling transformer. Similarly, other sources of information (e.g. speech, data and the like) have been coupled to the telephone tip and ring leads via a transformer. While transformers have found widespread use as signal couplers, they have certain disadvantages. For example, they often unduly load the telephone line. In addition, signal coupling transformers used in communication systems are generally larger and more expensive than desirable.

Therefore, it is an object of this invention to provide a new and improved signal coupler.

It is a further object of this invention to provide a signal coupler suitable for coupling communication signals, such as tone signals, voice signals, data signals and the like to a pair of wires of a communication system.

It is another object of this invention to provide a signal coupler suitable for coupling communication signals to a pair of communication wires without unduly loading the wires.

It is yet another object of this invention to provide a relatively small and inexpensive coupler for coupling signals to the wires of a communication system.

SUMMARY OF THE INVENTION

In the past, to some extent, the holding coils of communication systems have been replaced by gyrators. A gyrator is a linear time-invariant circuit that can be used to simulate a large inductance. A gyrator can be used to perform the function of a holding coil by connecting a capacitor across the input terminals of the gyrator and connecting the output terminals of the gyrator to a pair of communication wires (e.g., tip and ring leads). Holding coils, of course, are used to answer incoming telephone calls by establishing a DC path in a manner that creates a very small attenuation of incoming speech signals.

In accordance with the present invention the loop holding current created when a gyrator is coupled across a pair of communication wires is modulated by a signal to be coupled to the communication wires. More specifically, in accordance with the present invention, the signal to be coupled to the communication wires conrols the output of a controllable voltage source. The controllable voltage source is series conected in circuit with the capacitor and this series circuit is connected to the input of the gyrator. As a result, the gyrator output is modulated, whereby the loop holding current is modulated. Modulation is performed in a manner that does not unbalance the communication wires. In addition, the impedance of the gyrator is unaffected, whereby any other signals on the line are not attenuated by the invention.

A preferred form of the invention includes a gyrator comprising a high gain transistor arrangement and several resistors. Connected to the input of the gyrator is a capacitor connected in series with a controllable voltage source. Preferably the controllable voltage source comprises a resistor, connected in series with the capacitor; and, a controllable current source connected to the junction between the resistor and the gyrator. The signal to be coupled varies the current output of the current source, whereby the input voltage of the transistor arrangement varies. This variation varies the loop holding current in proportion to the signal to be coupled. Since the input of the gyrator is driven from a high impedance current source, no unbalance is created. Moreover, the impedance of the gyrator is unaffected, whereby other signals, carried by the pair of communication wires, are not attenuated.

It will be appreciated from the foregoing summary that the invention is a relatively uncomplicated electronic circuit that couples signals, such as tone, voice, data and the like to communication wires without requiring the use of a transformer. Since no transformer is required, and since the invention is formed of relatively small and inexpensive electronic components, the overall size and expense of a signal coupler formed in accordance with the invention is substantially less than the size and expense of a conventional coupling transformer.

BRIEF DESCRIPTION OF THE DRAWINGS

The foregoing objects and many of the attendant advantages of this invention will become more readily appreciated as the same becomes better understood by reference to the following detailed description when taken in conjunction with the accompanying drawings wherein.

DESCRIPTION OF THE PREFERRED EMBODIMENTS

Prior to describing the preferred embodiments of the invention, a brief discussion of the prior art system for coupling signals onto a pair of wires of a communication system is described. In this regard, the prior art description, as well as the description of the present invention, are directed to apparatus for coupling signals to the tip and ring lines of a telephone communication system. However, it is to be understood that the signal coupler of the invention can be used to couple signals to wires in other types of systems.

Figure 1:
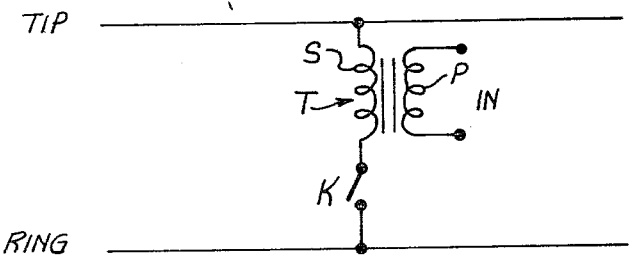
FIG. 1 is a schematic diagram of a prior art transformer type signal coupler for coupling signals to the tip and ring lines of a telephone communication system.

FIG. 1 illustrates a prior art system for coupling a signal to the tip and ring lines of a telephone communication system. The signal to be coupled to the tip and ring leads is applied to the primary winding, designated P, of a transformer designated T. The secondary winding, designated S, of the transformer T is connected in series with a telephone instrument actuated switch, designated K. The series connection is connected across the tip and ring leads. In operation, when the telephone instrument is moved off-hook, K closes, whereby the secondary winding of the transformer is shunt connected across the tip and ring leads. An answer tone, voice or other communication signal applied across the primary winding of the transformer is coupled to the tip and ring leads by the transformer.

There are two primary disadvantages to the arrangement illustrated in FIG. 1. First, the transformer T is larger and more expensive than desirable. Moreover, in many instances, the transformer T unduly loads the telephone line, whereby signals on the tip and ring leads are attenuated by an undesirable amount. The present invention overcomes these problems by providing a less expensive system for coupling signals to the tip and ring leads. Moreover, the present invention imposes a negligible impedance load and does not unbalance the telephone line.

Figure 2:
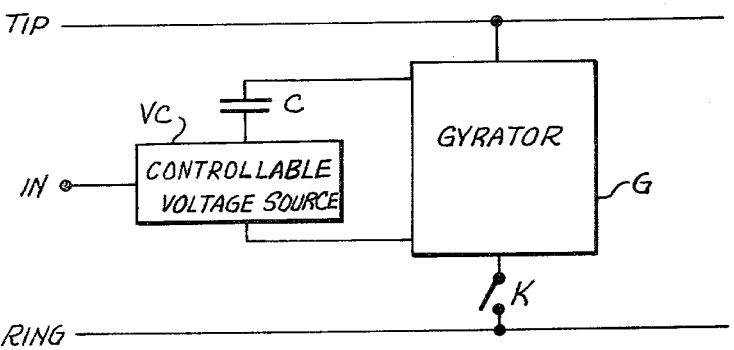
FIG. 2 is a partially block and partially schematic diagram of a preferred embodiment of the invention.

FIG. 2 is a block diagram illustrating a preferred embodiment of the invention and comprises a gyrator, designated G, a controllable voltage source, designated VC, and a capacitor, designated C. The capacitor C is connected in series with the output of the controllable voltage source VC and this series combination is connected across the input of the gyrator C. The gyrator output is connected in series with the telephone actuated switch K, across the tip and ring leads. The signal to be coupled to the tip and ring leads is applied to the controllable voltage source VC via an input terminal designated IN.

As will be readily understood by those familiar with gyrators, the capacitor C in combination with the gyrator forms a circuit that functions as an inductor. The thusly formed inductor performs the function of a holding coil. That is, when the telephone goes off-hook and the switch K closes, holding current flows through the gyrator inductor.

Figure 3:
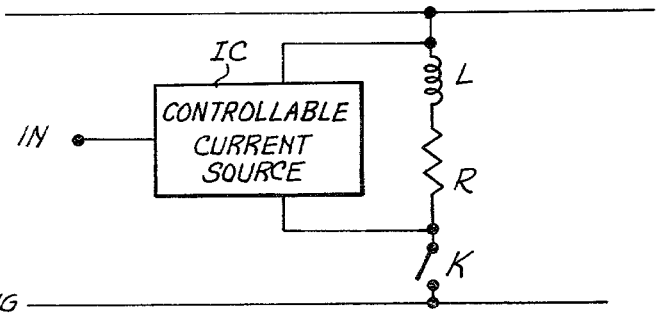
FIG. 3 is an equivalent diagram of the embodiment of the invention illustrated in FIG. 2; and, FIG. 4 is a schematic diagram of a preferred embodiment of a signal coupler formed in accordance with the invention for coupling signals to the tip and ring leads of a telephone communication system.

In accordance with the invention, the holding current is modulated by the output of the controllable voltage source VC, in accordance with the voltage fluctuations of the signal to be coupled. More specifically, the output of the controllable voltage source is modulated by the input signal. The modulated output of the controllable voltage source, via the gyrator modulates the holding current. Thus, the signal to be coupled is coupled to the tip and ring leads. This action will be more easily understood by reference to FIG. 3, which is an equivalent diagram of the embodiment of the embodiment of the invention illustrated in FIG. 2. More specifically, the capacitor C and the gyrator G are shown in FIG. 3 in equivalent circuit form as an inductor L and a resistor R and the controllable voltage source forms part of a controllable current source IC. The inductor L and resistor R are connected in series with each other and in series with the switch K. This series connection is connected across the tip and ring leads. The output of the controllable current source IC is connected across the series connected inductor L and the resistor R. In operation, when the output of the controllable current source varies, the current flow through the inductor L and the resistor R varies (assuming the switch K is closed). As a result the holding current flowing through the tip and ring leads fluctuates, whereby the signal applied to the input of the controllable current source IC is coupled to the tip and ring leads.

Figure 4:
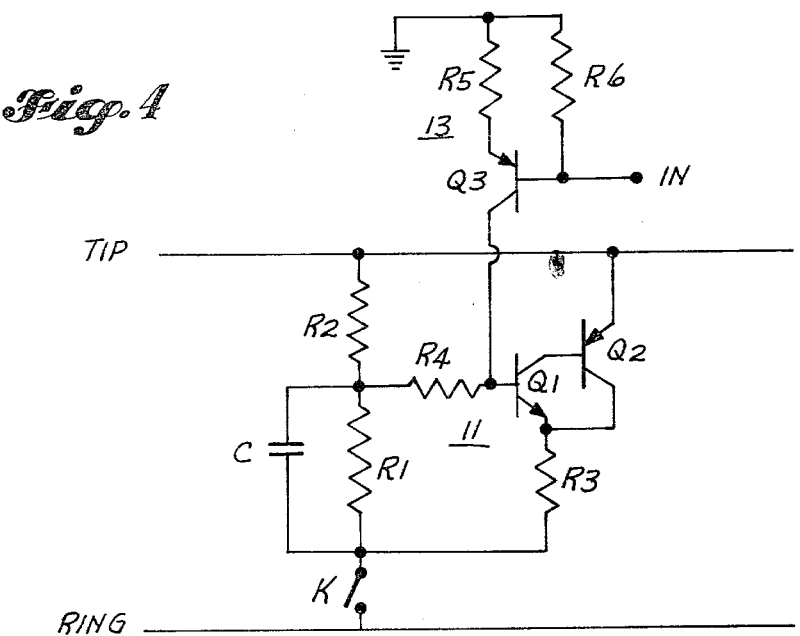

FIG. 4 is a more detailed diagram of a preferred embodiment of the present invention and comprises a gyrator 11, the capacitor C and a controllable voltage source 13. The gyrator 11 comprises: an NPN transistor designated Q1; and PNP transistor designated Q2; and three resistors designated R1, R2 and R3. The controllable voltage source comprises a resistor designated R4 and a current source comprising a PNP transistor designed Q3 and two resistors designated R5 and R6.

R1 and R2 are connected in series so as to form a voltage divider. The other end of R2 is connected to the tip lead of the communication wire. The other end of R1 is connected through K to the ring lead of the communication wire. C is connected in parallel with R1. The junction between R1 and R2 is connected through R4 to the base of Q1. The emitter of Q1 is connected through R3 to the junction between R1 and K. The collector of Q1 is connected to the base of Q2. The collector of Q2 is connected to the emitter of Q1 and the emitter of Q2 is connected to the tip lead. R5 is connected between the emitter of Q3 and ground. R6 is connected between the base of Q3 and ground; and, the collector of Q3 is connected to the base of Q1. The input signal, i.e. the signal to be coupled to the tip and ring leads, is received at the input terminal designated IN, which is connected to the base of Q3. Thus, the input signal is applied between ground and the base Q3. As will be readily understood by those skilled in the transistor art, the current source has a high output impedance.

As will be readily recognized by those skilled in the semi-conductor art, complementary transistors Q1 and Q2 are connected together so as to form a high gain transistor amplifier. Preferably, the gain of the transistor amplifier is 1,000 or greater. As will be appreciated by those skilled in this art, Q1 and Q2 could be replaced by a single transistor having a gain of 1,000 or more; or, a pair of Darlington connected transistors having a similar gain value.

In operation, when the voltage value of the signal to be coupled to the tip and ring leads varies, the current output of the current source varies. The modulated current is converted into a modulated voltage by R4 and the modulated voltage is applied to the base of Q1. As a result, the voltage across R3 varies, whereby the loop holding current created by the gyrator varies in proportion to the voltage of the signal to be coupled, i.e. the voltage applied at the input terminal IN. Coupling is accomplished without unbalancing the communications line, i.e. the tip and ring leads. Further, since the current source has a high impedance, the tip and ring leads are not loaded, whereby the equivalent loading coil impedance created by the gyrator is not changed. Since the gyrator impedance is unaffected, other signals on the line are not attenuated any more than they are by the gyrator taken alone.

As will be appreciated by those skilled in the art FIG. 3 is an equivalent representation of FIG. 4 as well as FIG. 2. In this regard, the inductance value of L is equal to R2·R3·C and the resistance value of R is equal to R3·R1+R2/R1. Further the output of the controllable current source IC is equal to I·R4/R3, where I is the current output of Q3.

While the signal coupler of the invention illustrated in FIG. 4 has substantially more components than a single transformer coupler, the actual cost of producing the circuit is substantially less than the cost of producing a transformer. Moreover, the size of the signal coupler of the invention is substantially less than a suitably sized audio transformer used in the past in communications systems. Consequently, the invention is smaller and less expensive than the prior art mechanism for performing the same function. Moreover, the invention provides an improved arrangement since signal coupling is accomplished without loading the telephone line, such as often occurs with prior art transformer coupling systems.

While a preferred embodiment of the invention has been illustrated and described, various changes can be made therein without departing from the spirit and the scope of the invention. For example, as indicated above, Q1 and Q2 can be replaced by a single transistor or by a Darlington pair of transistors, if desired. Moreover, other types of gyrator circuits and current sources may be more preferred in certain environments. Hence, the invention can be practiced otherwise than as specifically described herein.

The embodiments of the invention in which an exclusive property or privilege is claimed are defined as follows:

1. In a telephone communication system including balanced tip and ring leads and a gyrator and a capacitor circuit, said gyrator and capacitor circuit connected together so as to perform the function of an inductor, said gyrator and capacitor circuit connected to said balanced tip and ring leads for providing a holding current path when a telephone is connected to said tip and ring leads, the improvement comprising modulation means referenced to a predetermined voltage level for modulating the holding current flowing through said gyrator.

2. The improvement claimed in claim 1, wherein said modulation means comprises a controllable voltage source referenced to said predetermined voltage level connected to said gyrator and capacitor circuit.

3. The improvement claimed in claim 2 wherein said controllable voltage source includes a controllable current source referenced to said predetermined voltage level and a resistor and wherein said resistor is connected in series with said capacitor and said resistor/capacitor series circuit is connected to the input of said gyrator.

4. The improvement claimed in claim 1 wherein said predetermined voltage level is ground.

5. The improvement claimed in claim 4 wherein said modulation means comprises a controllable voltage source referenced to ground connected to said gyrator and capacitor circuit.

6. The improvement claimed in claim 5 wherein said controllable voltage source includes a grounded controllable current source and a resistor and wherein said resistor is connected in series with said capacitor and said resistor/capacitor series circuit is connected to the input of said gyrator.

7. A signal coupler for coupling communication signals referenced to a predetermined voltage level to communication wires, said signal coupler comprising:
(a) a controllable voltage source referenced to said predetermined voltage level and having an input for receiving said communication signals to be coupled to said communication wires and an output;
(b) circuit means having the electrical characteristics of an inductive holding coil comprising:
(1) a capacitor connected in series with the output of said controllable voltage source; and,
(2) a gyrator having an input and an output, said controllable voltage source and said capacitor connected in series therewith connected to the input of said gyrator, the output of said gyrator adapted to be connected to said communication wires.

8. A signal coupler as claimed in claim 7 wherein said predetermined voltage level is ground.

9. A signal coupler as claimed in claim 8 wherein said controllable voltage source includes a grounded controllable current source and a resistor for converting the output current of said controllable current source into a voltage, said resistor and said capacitor connected in series with one another.

10. A signal coupler as claimed in claim 9 wherein said controllable current source comprises a transistor having its base connected to receive said communication signal to be coupled to said communication wires and its emitter/collector terminals connected between one end of said resistor and ground so as to control the voltage drop across said resistor.

11. A signal coupler as claimed in claim 10 wherein said gyrator includes a high gain transistor arrangement, the input of said high gain transistor arrangement connected to the junction between said resistor and said transistor of said controllable current source, the output of said high gain transistor arrangement adapted to be connected to said communication wires.

12. A signal coupler as claimed in claim 9 wherein said gyrator includes a high gain transistor arrangement, the input of said high gain transistor arrangement connected to the junction between said resistor and said controllable current source, the output of said high gain transistor arrangement adapted to be connected to said communication wires.

13. A signal coupler as claimed in claim 7 wherein said controllable voltage source includes a controllable current source referenced to said predetermined voltage level and a resistor for converting the output of said controllable current source into a voltage, said resistor and said capacitor connected in series with one another.

14. A signal coupler as claimed in claim 13 wherein said controllable current source comprises a transistor having its base connected to receive said signal to be coupled to said communication wires and its emitter/connector terminals connected between one end of said resistor and said predetermined voltage level so as to control the voltage across said resistor.

15. A signal coupler as claimed in claim 14 wherein said gyrator includes a high gain transistor arrangement, the input of said high gain transistor arrangement connected to the junction between said resistor and said transistor of said controllable current source, the output of said high gain transistor arrangement adapted to be connected to said communication wires.

16. A signal coupler as claimed in claim 13 wherein said gyrator includes a high gain transistor arrangement, the input of said high gain transistor arrangement connected to the junction between said resistor and said controllable voltage source, the output of said high gain transistor arrangement adapted to be connected to said communication wires.

* * * * *